United States Patent [19]

Samala

[11] Patent Number: 4,526,790

[45] Date of Patent: Jul. 2, 1985

[54] CHEWING GUM PRODUCT

[75] Inventor: Fred Samala, Clarks Summit, Pa.

[73] Assignee: Topps Chewing Gum, Incorporated, Brooklyn, N.Y.

[21] Appl. No.: 518,618

[22] Filed: Jul. 29, 1983

[51] Int. Cl.³ ............................................... A23G 3/30
[52] U.S. Cl. ........................................ 426/5; 426/104; 426/112; 426/115; 426/392; 426/410; 426/413
[58] Field of Search ........................................ 426/3-6, 426/392, 410, 413, 112, 115, 284, 104

[56] References Cited

U.S. PATENT DOCUMENTS 4,156,740  5/1979  Glass et al. .............................. 426/3

FOREIGN PATENT DOCUMENTS

| 0086769 | 8/1983 | European Pat. Off. | 426/3 |
| 24228 | 6/1974 | Japan | 426/3 |
| 24226 | 6/1974 | Japan | 426/3 |
| 15854 | 6/1975 | Japan | 426/3 |
| 50858 | 4/1980 | Japan | 426/3 |
| 0685269 | 9/1979 | U.S.S.R. | 426/3 |

OTHER PUBLICATIONS

Food Manufacture, "Food in Collapsible Tubes", Oct. 1950, pp. 417–419.

*Primary Examiner*—Jeanette Hunter
*Attorney, Agent, or Firm*—Mark T. Basseches; Paula T. Basseches

[57] ABSTRACT

An extrudable chewing gum packaged in a deformable container having a capped extrusion orifice, said gum being readily extrudable from said container at ambient temperatures, being resistant to syneresis over long storage periods, and exhibiting minimal filamenting tendencies. The process involves admixing with a gum formulation including gum base and sweetener, the base preferably including poly vinyl acetate, a solution of thermo reversible gelling agent the solution being heat activated, and in sufficient quantity to raise the free water content of the gum composition to at least about 11%, and extruding the formulated gum composition into the deformable container while the gum admixture is at a temperature above the thermal reversal temperature of the gel.

10 Claims, No Drawings

CHEWING GUM PRODUCT

This invention relates to a new article of manufacture and to the method of making the same, and is directed more particularly to a novel chewing gum product and mode of its fabrication.

Still more particularly, the invention relates to a chewing gum product comprising a deformable container, such as a tube, filled with a chewing gum portion which is extrudable from the tube at ambient temperatures and which is resistant to syneresis over protracted periods when stored under ambient conditions. It is to be understood that the term "deformable container" as used herein is not to be limited to conventional toothpaste containers but, rather, is to be broadly interpreted to encompass dispensers such as caulk guns and containers associated with pumping systems, etc.

BACKGROUND OF THE INVENTION

1. Field of the Invention

The present invention is in the field of chewing gum products and pertains more particularly to an extrudable chewing gum packaged in a deformable container similar to a toothpaste, caulk gun type package or the like.

2. The Prior Art

As is well known, chewing gum is conventionally supplied in a number of forms. By way of example, the gum may be supplied in individually wrapped slabs, in sugar encapsulated portions, such as ball gum or pellets, or strips, wafers or ropes.

Attempts have been made by Topps Chewing Gum, Incorporated, assignee of the present application, to devise a chewing gum product packaged in plastic or like deformable tubular containers whereby increments of the chewing gum may be extruded by compressing the tube, with the remainder of the gum being retained in sanitary condition by application of the tube cap.

Initial attempts to provide a suitable gum formulation were unsuccessful. No known gum formulation possessed sufficiently low viscosity to permit extrusion at ambient temperatures by pressure exerted on a tube. Attempts to render gum formulations extrudable by the addition of high water content resulted in a composition which, while initially extrudable, was unsatisfactory since it exhibited syneresis even after short storage periods.

Additionally, even the water enhanced conventional gum formulations, immediately after packaging and not yet exhibiting syneresis, were so cohesive that after extrusion of a short segment corresponding to a desired portion, it was found virtually impossible to remove the extruded component at the tube nozzle without drawing from the tube strings or filaments of gum from the components remaining in the tube.

To summarize, the attempts by the inventor hereof to provide a gum formulation suitable for dispensing from a deformable container, such as a tube, has heretofore presented apparently insurmountable technical difficulties.

Various aspects of gum formulations of some pertinence may be found in one or more of the below noted U.S. Pat. Nos.:

| | |
|---|---|
| 1771,506 | Mustin |
| 2256,190 | Bowman |
| 3857,963 | Graff et al |
| 4065,578 | Reggio et al |
| 4156,740 | Glass et al |
| 4161,544 | Kaul | none of which, however, remotely teaches or suggests a formulation or fabricating procedure which enables the production of a chewing gum composition suitable for dispensing by extrusion.

SUMMARY OF THE INVENTION

The present invention may be summarized as directed to a new and useful article of manufacture, namely, a chewing gum product packaged within a deformable tube type dispenser which is characterized by its ability to be extruded at ambient temperatures (e.g. upwards of about 50° F. (10° C.), to break cleanly at the exit end of the orifice of the tube without drawing threads or filaments from the interior, and to resist syneresis over protracted periods of storage.

The invention is further directed to a novel method of manufacturing a gum product of the type described.

It has unexpectedly been discovered that a chewing gum formulation suitable for extrusion and yet resistant to syneresis despite protracted periods of storage may be manufactured by embodying in the formulation a uniquely high water content (i.e. at least about 11%), the formulation including a gel-forming material or admixture of materials such as one or more of the following, guar, xanthan, locust bean, pectin and carageenan. The gum may include a sugar (sucrose) content of from about 52% to 62% by weight.

It is important to the provision of a satisfactory end product, i.e. one which is extrudable at ambient temperatures and resistant to syneresis, that the gel system formed by the gel component be formed in situ, i.e. in the dispenser which will ultimately be distributed. More specifically, the gum formulation should be introduced into the dispenser with the gel components in a liquid state and the gel system formed thereafter. Preferably this is accomplished by embodying in the gum formulation a thermally reversible gel system which has been activated. The gum formulation is heated to a temperature above the reversal temperature, and is introduced into the dispenser while thus heated. The heated composition is preferably introduced into the dispenser by an extrusion step which subjects the composition to laminar flow influences. The laminar flow influence appears to assist in the formation of an effective gel system in the dispenser.

As will be apparent to those skilled in the art and familiarized with the instant disclosure, it is anticipated that numerous variations on the formulations may be created to provide a satisfactory gum product extrudable at ambient temperatures. The essential features of the invention are considered to include a high water content to render the product extrudable and a completed gel system in the packaged product to render the same resistant to syneresis. Preferably there is employed a gum base including p.v.a. to enable a clean break to be formed between an extruded portion and the remaining contents of the dispenser.

It has been discovered that the manner of processing the formulation is critical to the provision of a satisfactory product.

In general, the processing steps include compounding the gum base, sugar and flavoring components in conventional manner, and adding thereto an activated gel component or components, the materials being processed in a manner which assures that the gel system will form or reform after the gum portion is introduced into the deformable container.

Preferably, the selected gel components are of the thermally reversible type, in which case they must reverse at a temperature sufficiently low that when the entire formulation (gum base, sugar and gel-forming components) are again heated to a temperature within the thermal reversing range, the gum, upon recooling, maintains the desired chew characteristics.

It may be pointed out that the ultimate gum formulation incorporates a water content of about 11% to 13%, which is three or more times the moisture content of chewing gums of even the "soft gum", high moisture content type, such as the chewing gum product known as "SOFT BAZOOKA". Despite such uniquely high water content, the gum product of the present invention is resistant to syneresis even after protracted periods, and exhibits a satisfactorily firm initial chew characteristic.

Accordingly, it is an object of the invention to provide a unique article of manufacture, namely, a dispensing tube or like deformable container including a recloseable orifice, such tube being filled with chewing gum extrudable under ambient temperature conditions and being storable under ambient conditions over protracted periods without exhibiting syneresis.

A further object of the invention is the provision of a method of manufacturing the article above defined.

DESCRIPTION OF MANUFACTURE

There will now be described a series of formulations, namely a series of gum base-sweetener-flavoring formulations and a second series of gel-forming formulations.

In each instance, in respect of the gel formulations, there will be defined an approximate activating temperature and an approximate minimum reversal temperature, it being understood that in the process steps hereafter described the terms "reversal temperature" and activating temperature" are intended to relate to the temperatures denoted in the specific gel-forming mixture employed.

| Gum Formulation No. 1 | percentage by weight |
|---|---|
| Sugar | 52.18 |
| Gum base | 20.01 |
| Gel System No. 1 | 25.59 |
| Softeners (50—50 blend glyceryl monostearate, and lecithin blended with corn syrup and water to form a paste) | 1. |
| glycerine | .55 |
| liquid flavor | .49 |
| dry flavor | .16 |
| color | .02 |
| | 100% |

| Gum Formulation No. 2 | percentage by weight |
|---|---|
| Sugar | 52.37 |
| Gum base | 16. |
| Gel System No. 2 | 15.73 |
| Corn syrup | 11.33 |

| Gum Formulation No. 2 (continued) | percentage by weight |
|---|---|
| Softeners (as in Gum Formulation No. 1 | .57 |
| Liquid sorbitol (70% solution) | 3. |
| Glycerine | .55 |
| Liquid flavor | .43 |
| Color | .02 |
| | 100% |

GUM BASE

Numerous gum base formulations may be satisfactorily employed, formulations incorporating relatively high percentages of poly vinyl acetate (pva) being preferred where a bubble gum base is used.

It has been determined that pva containing bubble gum base formulations are preferable since the same tend to break cleanly at the nozzle when a gum portion is extruded from the tube by the user. Where the extrudable gum need not be of the bubble gum type, it is not necessary to include pva in the formulation.

Bubble gum formulations containing lesser amounts or no pva, while satisfactory from the standpoint of being extrudable at ambient temperatures and resistant to syneresis, are somewhat less desirable in that when a portion is removed from the dispenser nozzle by the user, the gum exhibits taffy-like characteristics evincing the formation of filaments or threads of gum.

A satisfactory bubble gum base is described hereinafter by way of example.

| GUM BASE | percentage by weight |
|---|---|
| Poly isobutylene | 13. |
| Poly vinyl acetate | 28. |
| Terpene resin | 10. |
| Calcium carbonate | 30. |
| Petroleum wax | 1. |
| Mono- and di-glycerides | 8.5 |
| Tri-glycerides | 9.5 |
| | 100% |

Satisfactory alternate gum base formulations of the pva type are disclosed in U.S. Pat. Nos. 3,473,933—Sato, and 3,984,574—Comollo.

A highly satisfactory, commercially available premixed gum base is a proprietary formulation incorporating pva as available from Lotte Co. Ltd., of Tokyo, Japan, identified as Lotte AB-1.

| GEL SYSTEM FORMULATIONS | |
|---|---|
| Gel System No. 1 | Percentage by weight |
| Water | 48.4 |
| Sugar | 35.23 |
| Corn syrup | 14.97 |
| Preservatives | .4 |
| Gelling agent (the gelling agent is comprised of a blend of xanthan gum, locust bean gum and guar gum) | 1.0 |
| | 100% |

Substantial variation in proportions of the gum components may be tolerated, representative ranges being 50:40:10 to 50:25:25 xanthan, locust bean and guar, respectively.

The noted gel system is activated at about 170° F. (77° C.) and has a reversal temperature of about 95° F. (36° C.).

| Gel System No. 2 | percentage by weight |
| --- | --- |
| Corn syrup | 50. |
| Water | 48.10 |
| Preservatives | .4 |
| Carageenan | 1.5 |
| | 100% |

Note: The specific carageenan employed is sodium carageenan, being a sulphated galactan, the degree of sulphation being 20 to 40% by weight, calculated as SO$_4$.

The activating temperature of Gel System No. 2 is about 120° F. (49° C.), reversal temperature about 100° F. (38° C.).

A suitable carageenan product is available under the commercial name CARAGEENAN CJ from the Hercules Corporation.

GEL SYSTEM PREPARATION

In a conventional mixer such as Littleford Mixer Model FM130D (propeller or paddle mixer in heated kettle can be substituted) the water component is charged at a temperature of about 126° F. (52° C.). The gel forming materials and preservatives are added with agitation. Corn Syrup is added and the entire mixture heated to about 170° F. (77° C.) with agitation.

GUM PREPARATION

In a sigma blade mixer are added the gum base, glycerine and approximately one third of the sugar, the mixture being heated to about 100° F. (38° C.). To this mixture approximately one fourth of the gel system is added, together with the coloring agents, if any, the mixing continuing for approximately eight minutes. The gel system portions for System No. 1 are added at about 170° F. (77° C.) and for the other system at about 120° F. (49° C.). The remaining portions of the gel system and sugar are added in separate charges, preferably three or more, with agitation of fifteen minutes on each charge. The flavor ingredients are then added and the completed formula is mixed for twelve minutes.

The resultant product may be extruded under pressure into a storage container or may be extruded directly into the ultimate dispenser tube or container.

Where the material is stored, it is necessary to reheat the material to a temperature above the reversal temperature of the gel system before the same is introduced into the dispensing tube or container. For reasons which are not altogether clear, the characteristics of the gum composition in the dispensing container or tube, and particularly its extrudability and resistance to syneresis, appear to be enhanced where the material is subjected to laminar flow.

If, for example, an increment of the completed gum composition is bodily removed from the heated batch and placed in a tube, the composition, upon cooling and storage, evinces greater tendencies toward syneresis than is the case if the material is extruded into the tube and thus subjected to laminar flow.

It is believed that the extrusion step functions in some manner to achieve a molecular orientation of the gel-forming components, enabling the fabrication in the tube, upon cooling, of a more efficient or effective gel system.

The extrusion procedure has been carried out utilizing extruder orifices of sizes ranging from one half inch to one and one half inches.

The dispensing tube in which the gum composition is marketed may, of course, vary in size.

The typical tube may be made of thin-walled polyethylene and be provided with a tube extrusion orifice one half inch in diameter.

Preferably the tubes, as is conventional, are filled through the end remote from the extrusion orifice, the tube being sealed after filling by an ultrasonic sealing step or a heat sealing step, whereby a seam or bond is formed between the opposed walls of the tube.

As will be apparent to those skilled in the art, numerous variations by way of formulation changes and the like may be made without departing from the spirit of the invention.

The essential features of the invention are considered to reside in the provision of a chewing gum composition which is rendered extrudable by embodying a high water content, such as about 11% or more, and which is rendered resistant to syneresis by the incorporation in the gum formulation of an activated gel component, the gum composition having been introduced into the dispenser in such manner that the gel is in a liquid phase and reverses to or assumes the solid phase in situ in the dispenser. The invention is thus not to be limited to the specific examples set forth but, rather, is to be broadly construed within the scope of the appended claims.

Having thus described the invention and illustrated its use, what is claimed as new and is desired to be secured by Letters Patent is:

1. An article of manufacture comprising a deformable container having a capped extrusion orifice, said container being filled with a chewing gum composition, said composition being resistant to syneresis over protracted storage periods and being extrudable under ambient temperature conditions, said composition including gum base, sweetener, about 11% or more water by weight, and an activated, thermally reversible solution of a gelling agent, said gel solution being solid at ambient temperatures said gum composition having been introduced into said container at a temperature above the reversal temperature of said gel composition by an extrusion process thereby to introduce laminar flow in said composition in the course of filling said container.

2. An article in accordance with claim 1 wherein said gum base incorporates poly vinyl acetate.

3. An article in accordance with claim 2 wherein said poly vinyl acetate is present in the range of from about 2 to about 6% by weight of said chewing gum composition.

4. An article in accordance with claim 1 wherein said gelling agent is selected from the group consisting of xanthan, guar, locust bean, carageenen and pectin.

5. The method of manufacturing an extrudable chewing gum in a deformable container having an extrusion orifice, comprising dissolving thermally reversible gelling agent in water and heating the solution to a temperature above the activating temperature of said gelling agent to provide a solution which, at ambient temperatures, will form a thermally reversible gel, admixing said activated solution with a mixture of gum base and sweetening agent in an amount sufficient to form a chewing gum composition including at least about 11% free water, and thereafter extruding said gum composition into a deformable container having a cappable extrusion orifice while maintaining said composition at a temperature above the reversal temperature of said gel forming solution.

6. The method in accordance with claim 5 wherein said gelling agent is selected from among the class consisting of one or more of the following: xanthan, guar, locust bean, carageenen and pectin.

7. The method in accordance with claim 5 wherein said gum base incorporates poly vinyl acetate in the range of from about 2 to 6% by weight of the final gum composition.

8. The method in accordance with claim 7 wherein said gum formulation includes by weight from about 3.8 to 20% corn syrup and from about 52 to 62% sucrose.

9. The method of fabricating a chewing gum which is extrudable at ambient temperature conditions, includes about 11 to 13% free water and is resistant to syneresis over protracted storage periods, comprising forming a gum by mixing by weight, about 16 to 20% gum base, sweeteners and flavorants, adding to said gum a solution of a heat activated thermally reversible gelling agent, said gelling agent being present in said solution in quantity sufficient to convert said solution to a gel state at ambient temperatures, said solution having a temperature above the activating range of said gel, blending the gum and gel solution admixture while maintaining the temperature thereof above the reversal temperature of said gel solution, and extruding an increment of said admixture into a deformable dispenser having a capable extrusion orifice, said extrusion step being effected while said increment is above said reversal temperature.

10. An article of manufacture made in accordance with the process of claim 9.

* * * * *